United States Patent
Wada et al.

[19]

[11] Patent Number: 5,987,039
[45] Date of Patent: Nov. 16, 1999

[54] MULTIPLEXING SYSTEM FOR ISDN CIRCUITS

[75] Inventors: Yasuo Wada; Toshikatsu Watanabe, both of Koriyama, Japan

[73] Assignee: Hitachi Telecom Technologies, Ltd., Tokyo, Japan

[21] Appl. No.: 08/758,254

[22] Filed: Nov. 27, 1996

[51] Int. Cl.⁶ ..................................................... H04J 3/12
[52] U.S. Cl. .......................................... 370/524; 370/537
[58] Field of Search .................................... 370/420, 433, 370/435, 437, 468, 472, 493–495, 498, 537, 538, 524

[56] References Cited

U.S. PATENT DOCUMENTS

| | | | |
|---|---|---|---|
| 5,031,211 | 7/1991 | Nagai et al. | 379/221 |
| 5,067,125 | 11/1991 | Tsuchida | 370/79 |
| 5,210,740 | 5/1993 | Anzai et al. | 370/16 |
| 5,442,622 | 8/1995 | Hokari | 370/16 |
| 5,446,732 | 8/1995 | Miyamoto | 370/58.2 |

Primary Examiner—Chi H. Pham
Assistant Examiner—Kim T. Nguyen
Attorney, Agent, or Firm—Antonelli, Terry, Stout & Krauss, LLP

[57] ABSTRACT

A multiplexing system for ISDN circuits. Multiplexers in the system include data terminals, voice interfaces having voice trunks, high speed digital circuits and ISDN circuits, together with a control channel interface which connects trunking circuits by controlling calls on the control channel. When an outgoing voice call originates, data information from data terminals voice is multiplexed with compressed information from a voice interface and transmitted to trunking circuits. When calls originate, the control channel controls calls and connects them with trunking circuits. When using ISDN circuits, after setting up a communication channel for the circuits, a CPU controls calls to multiplex ISDN circuits on the control channel. By this structure decreasing the multiplexing ratio due to voice multiplexing call control on ISDN circuits can be eliminated when linking multiplexers with communication channels having high speed digital circuits and ISDN circuits.

5 Claims, 8 Drawing Sheets

MULTIPLEXING SYSTEM FOR ISDN CIRCUITS

BACKGROUND OF THE INVENTION

This invention relates to an ISDN circuit multiplexing system using a multiplexer in which high speed digital and ISDN circuits are installed, and specifically relates to an ISDN circuit multiplexing system in which incoming calls and call control connections are made through the aforementioned ISDN circuit.

Call control data on an ISDN circuit control channel (D-channel) include the call control data for only the channel on the ISDN circuit. No call control data are included for multiplexing ISDN circuit channels. Therefore, when one tries to dynamically use ISDN circuits by allocating a needed band width for outgoing calls from terminals, it is not possible to multiplex a plurality of outgoing calls for transmission (for example, to have a 64 Kbps band transmit four 16 Kbps of compressed voice data). When using a multiplexed ISDN circuit, one has had to install a dedicated control channel within the ISDN circuits independent from the control channel to control calls based on one's unique data; or one has had to allocate a fixed band for the fixed use of ISDN circuit communication channels.

In the related technology, when one attempts multiplexed use of ISDN circuits by manipulating calls from terminals, a special control channel must be installed, consequently increasing the number of pieces of equipment required for controlling control channels. In addition, an additional band for the aforementioned control channel is required within the ISDN circuits, decreasing operational efficiency; This also complicates multiplex processing with respect to send/receive data control in the control channel.

SUMMARY OF THE INVENTION

This invention intends to provide a multiplexing system for ISDN circuits in which call control by means of an ISDN circuit for the voice-grade multiplexed linking does not decrease the multiplex ratio when multiplexers are connected to a communication channel constituted with a high speed digital circuit and an ISDN circuit.

This invention pays an attention to the fact that there is a high speed digital circuit between multiplexers and makes the control channel of the aforementioned high speed digital circuit (Dp-channel) available for multiplexed linking by means of ISDN circuits.

In addition, call control data for transmitting outgoing calls coming from a terminal are dynamically sent/received by the control channel of a high speed digital circuit connecting multiplexers, upon setting up a ISDN circuit communication channel by means of said multiplexers. Also, the control data are constituted in the same manner as the call control data of trunk circuits; the data not related with communication channels are transmitted via a control channel of high speed digital circuits.

The above configuration for the dynamic use of ISDN circuits for outgoing calls coming from terminals eliminates the need for a special control channel, providing inexpensive and efficient multiplexed transmission on ISDN circuits.

DETAILED DESCRIPTION OF THE PREFERRED EMBODIMENTS

This invention is described referring to drawings hereafter.

Figure 1:
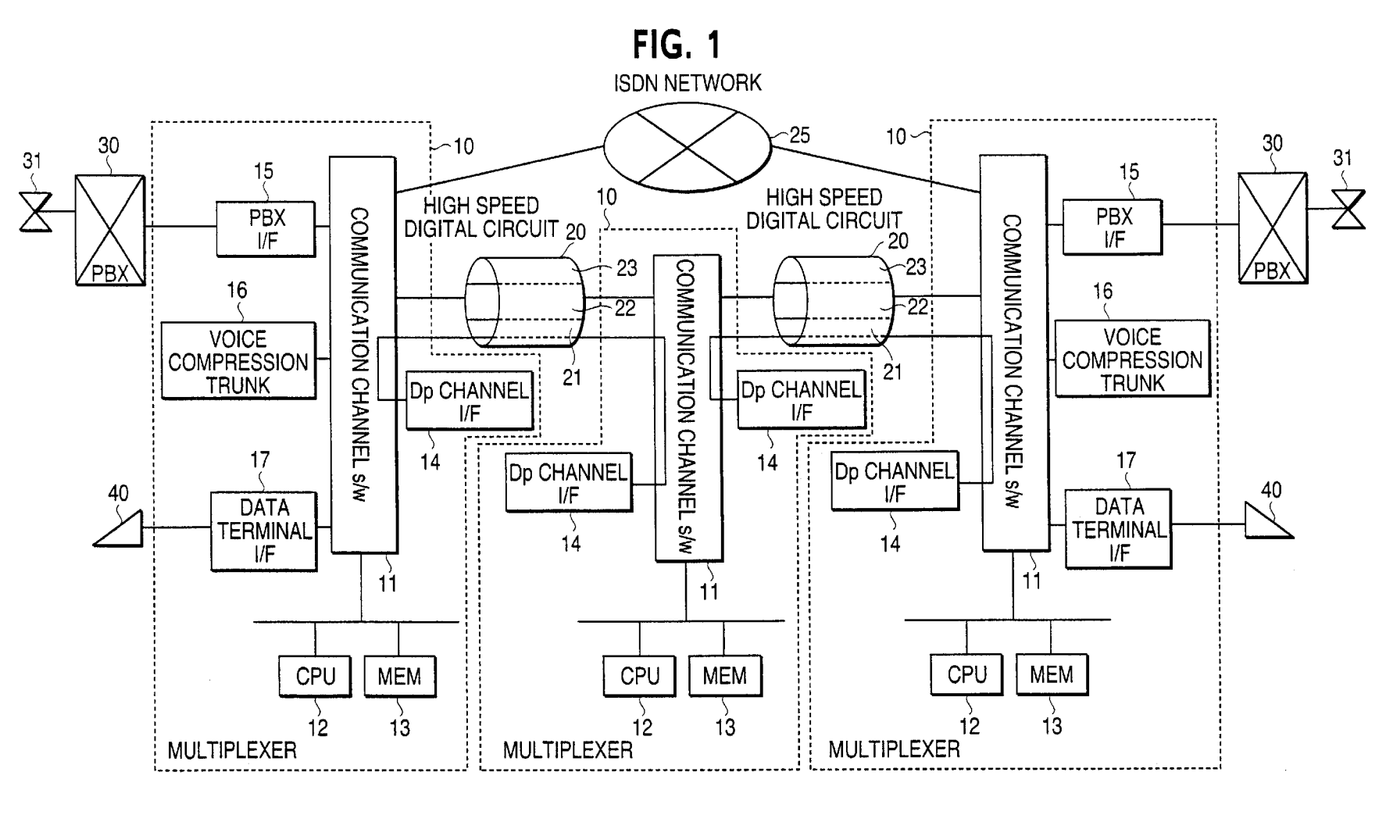
FIG. 1 is a diagram showing the trunking system of the multiplexer of this invention.

FIG. 1 is a schematic configuration of a trunking system to which the circuit multiplexing system of this invention is applied. This trunking system is constituted with a plurality of multiplexers 10, high speed digital circuits 20 which mutually connect these multiplexers 10, and an ISDN network 25, a back up for the high speed digital circuits. For the two end the multiplexers 10, a plurality of voice terminals 31 such as telephones are connected via a switchboard (PBX) 30, together with a plurality of data terminals 40.

A multiplexer 10 comprises: a communication channel switch 11, which forms a communication channel between trunk circuits 20 and 25 together with a variety of terminals 40, switchboards 30 and the like; a CPU 12; memories 13 which store a variety of programming such as switching behavior control programming, configuration data, and various tables and the like; control channel interface circuits 14 (hereafter referred to as Dp-channels); 4WSS/SR digital interfaces, 4WSS/SR analog interfaces or 2MTTC digital interface circuits 15 for connecting multiplexers 10 with switchboards 30; voice compression trunks 16 for converting (compressing) 64 Kbps PCM voice signals into 32 Kbps, 16 Kbps or 8 Kbps and/or inversely converting (decompressing) to communicate via high speed digital circuits 20; data terminal interface circuits 17 which interface with data terminals 40 having V.24, X.21 or V.35 interfaces; and interface circuits for connecting high speed digital circuits 20 and ISDN circuits 25.

Now, high speed digital circuits 20 are I-interfaced for connecting multiplexers 10 for communication. In addition, ISDN circuits 25 are used as back up in place of high speed digital circuits during outage or are used for accommodating the overflow from high speed digital circuits 20.

Voice data from voice terminals 31 such as telephones linked with a switchboard are compressed by means of a voice compression trunk 16 in the multiplexer 10 and are connected with the voice terminals 31 in the facing station via high speed digital circuits 20, thus connecting voice communication between facing stations.

Figure 2:
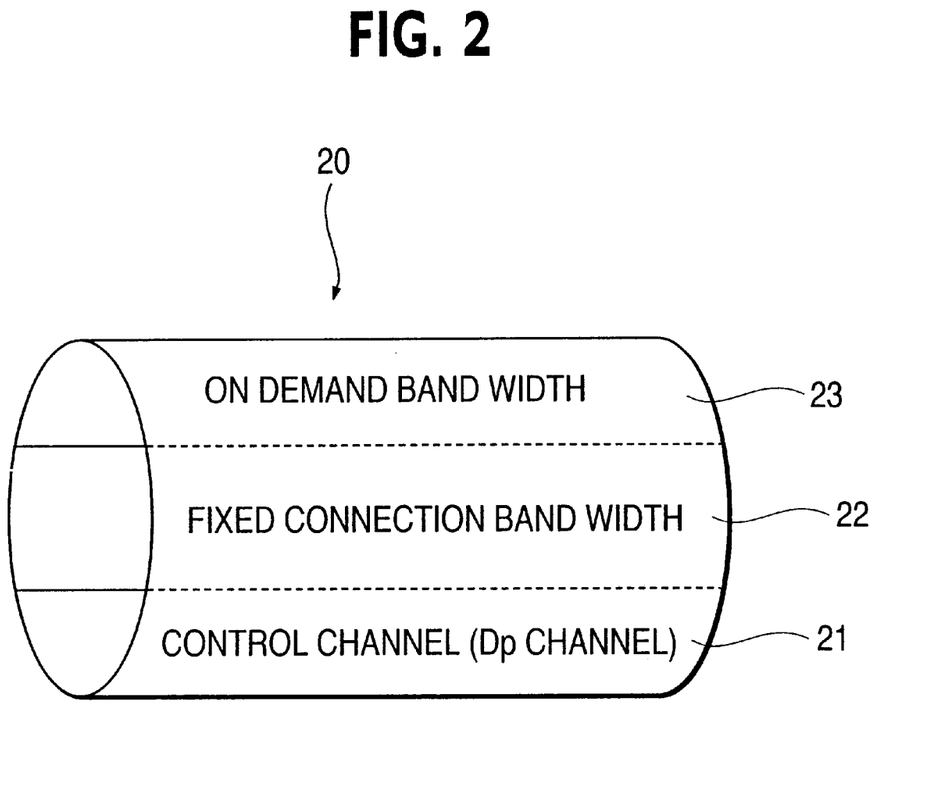
FIG. 2 is a diagram showing an embodiment of the allocating band width for high speed digital circuits as illustrated in FIG. 1.

FIG. 2 illustrates an embodiment for the use of band width within high speed digital circuits 20 used in this invention. The band width within high speed digital circuits 20 is, in general, constituted with: control channel (Dp channel) band width 21 between multiplexers 10 for communicating control data such as connecting calls and the like; fixed connection band width 22 for fixed connection of data terminals and the like on a normally connected basis; and on-demand band width 23 for obtaining a specific band width when demanded by outgoing calls and the like from terminals.

For example, when 1536 Kbps are allocated for the band width for the high speed digital circuit 20, 8 Kbps are allocated for the band width for a control channel 21, 768 Kbps are allocated for the band width for fixed connection 22, and the remaining 760 Kbps are allocated for the band width for on demand 23.

Figure 3:
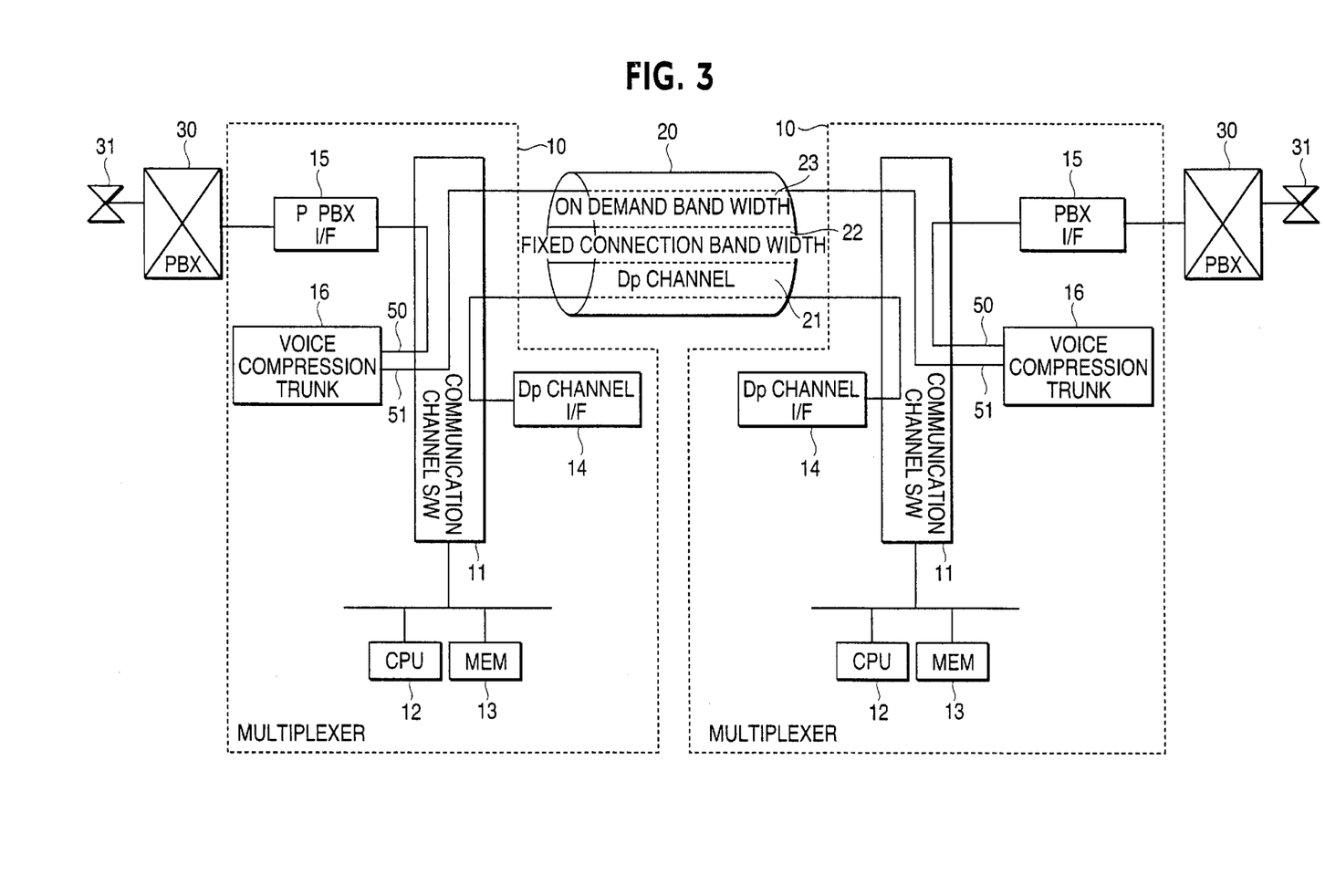
FIG. 3 is a diagram showing a communication routing for voice compression data via trunking circuits.

FIG. 3 illustrates a routing for connecting voice terminals 31 linked with a switchboard 30, being compressed by means of a voice compression trunk 16 in the multiplexer 10 and connected with the voice terminals 31 linked with a switchboard 30 in the facing station.

For example, if outgoing calls occur at the voice terminals 31 installed in the multiplexer 10 on the left hand side, and numbers are dialed, then, the switchboard 30 drives the interface circuit 15 linked with the switchboard. The central processing unit (CPU) 12 detects the fact that the interface circuit 15 linked with the switchboard is driven and acquires the voice compressing trunk 16 for voice compression.

Now, the voice compression trunk 16 is given a port 50 for connecting voice data without compression and a port 51 for connecting compressed voice data, and the voice data are supplied to and put out from communication switch 11.

The CPU 12, after acquiring the voice compression trunk 16, connects the interface circuit 15 linked with the switchboard 30 and the port 50 for voice data without compression via the communication switch 11. In addition, because the CPU 12 connects voice compression signals via the high speed digital circuit 20, the CPU 12 obtains a required band width (16 Kbps band width for the compression to 16 Kbps) from the on-demand band width 23 within the high speed digital circuit 20 via the voice compression port 51 of the voice compression trunk 16 and the communication switch 11. At this time, the CPU controls the Dp channel interface circuit 14 via the control channel band width 21 to drive the facing station for the calls on demand and sends call control data.

In the facing station on the right hand side of the figure, the Dp channel interface circuit 14 receives the call control data and recognizes the fact that there are incoming calls that are on demand, then, acquires a voice compression trunk 16 and connects the voice compression port 51 of that trunk 16 at the specific band width on high speed digital circuits 20 via a communication channel switch 11. In addition, the port 50 for voice data without compression of that trunk 16 is connected with the interface circuit 15 which interfaces the port 50 and a switchboard 30 via the communication channel switch 11 for driving the switchboard 30 to call and connect with the voice terminal 31.

In this way, the multiplexers 10 are given functions for the effective use of the high speed digital circuits 20 such as notifying voice data with a small band width using voice compression technique and the on demand feature for obtaining a required band width on demand.

Figure 4:
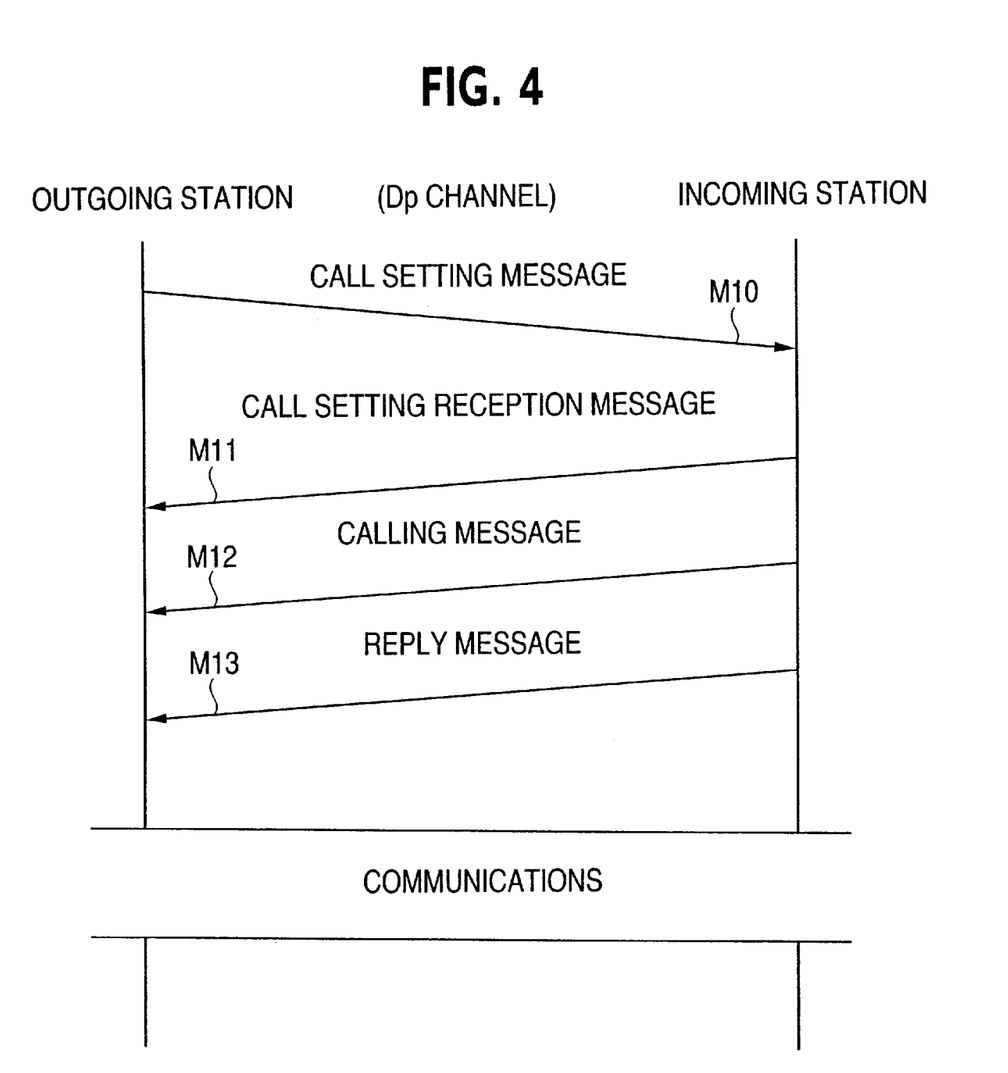
FIG. 4 is a diagram showing a call control sequence during call controlling at trunking circuits.

FIG. 4 illustrates the control sequence for call control messages exchanged on the Dp channel when connected on demand. The outgoing station sends a call setting message M10 to the facing (incoming) station. This call setting message M10 includes compression data for voice compression and the data for the applied band width within the high speed digital circuits 20 and the like. The incoming station that received the call setting message M10 analyzes the contents of this call setting message M10; if the contents are processable, the station returns the call setting reception message M11. In addition, sending the call message M12 and reply message M13 from the incoming station establishes communications.

Also, receiving the reply message M13 at the outgoing station establishes communications.

The call control messages in this call control process are sent/received between the Dp channel interface circuits 14 using the control channel band width 21 within the high speed digital circuits 20.

Figure 5:
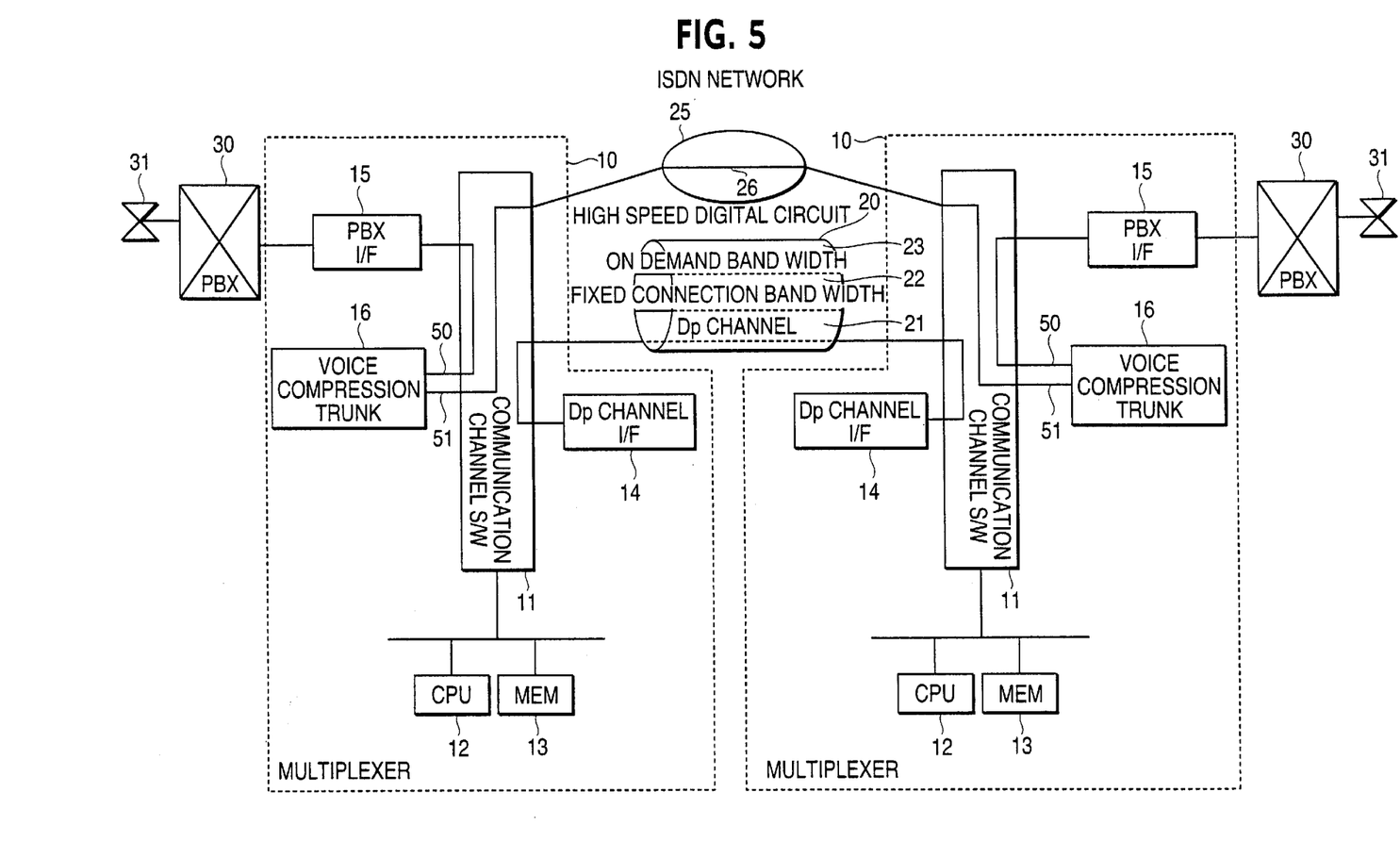
FIG. 5 is a diagram showing a communication routing for voice compression data using ISDN circuits.

FIG. 5 illustrates the connection route established when voice data from the voice terminals 31 linked with the switchboard 30 are compressed by means of the multiplexer 10, and transmitted to voice terminals 31 linked with the switchboard 30 in the facing station using an ISDN network 25. Here described is the connection system to meet the situation in which the voice terminals 31 are calling the voice terminals 31 in the facing station but all the high speed digital circuits 20 are busy and, therefore, not available, then, the voice data automatically take a detour using the ISDN network 25.

First of all, when the voice terminals 31 in the outgoing station call the voice terminals in the facing (incoming) station and dial their numbers, the CPU 12 acquires the voice compression trunk 16, as illustrated in the aforementioned FIG. 3, and obtains the needed band width from the on-demand band width 23 within the high speed digital circuits 20. When all the on-demand band widths are busy and the required band width is not available at the time, the CPU 12 drives the ISDN circuits 25 to set up a communication channel 26 with the facing station. This ISDN communication channel 26 is used in place of the high speed digital circuits 20.

An ISDN communication channel is set up by allocating a 64 Kbps band width (B-channel) following the general D-channel control data. In addition, when the ISDN communication channel 26 is set up, it is controlled in the same way as the on-demand band width 23 within the high speed digital circuits 20. Therefore, the actual call control data control the D-channel interface circuits 14 and send/receive call control signals via the control channel band width 21 within the high speed digital circuits 20.

The status of the communication channel switch 11 is the same as it is for connecting the high speed digital circuits 20. With this processing, when 64 Kbps (B-channel) are allocated for the ISDN network 25 band width, four calls can be communicated in a single B-channel if the voices are compressed to 16 Kbps.

Figure 6:
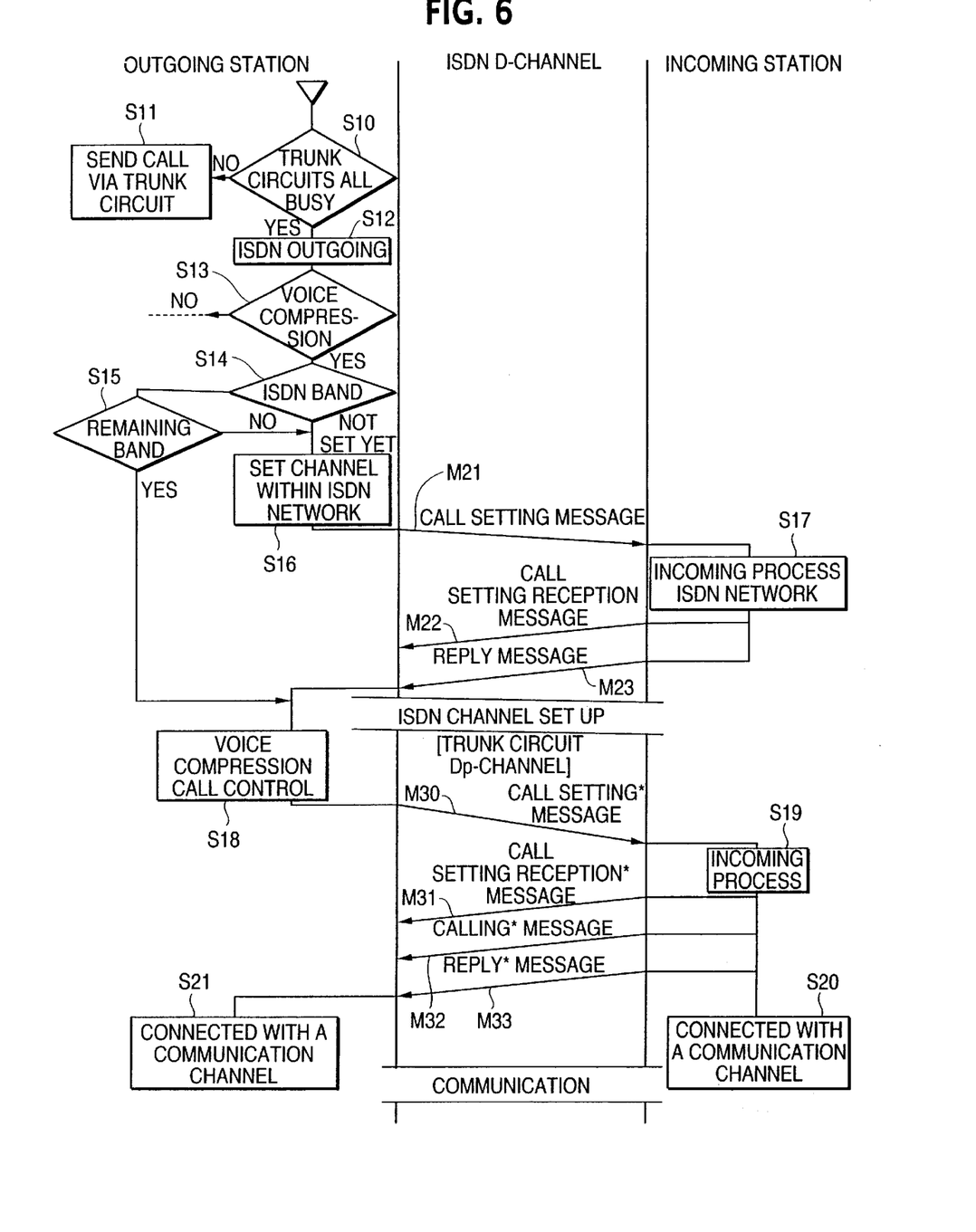
FIG. 6 is a diagram showing a control sequence for transmitting voice compression data originated from ISDN circuits.

FIG. 6 illustrates the call control sequence when compressed voice data is outgoing from ISDN circuits. The operation of this invention is described hereafter referring to the flow chart and control data send/receive sequence illustrated in FIG. 6.

To begin with, upon recognizing outgoing calls from voice terminals 31, the CPU 12 determines whether or not all the high speed digital circuits 20 are busy (S10). When there is a vacancy, it connects calls using the high speed digital circuits 20 and controls them using the Dp-channel illustrated in FIG. 4 (S11).

At the step S10, when all the high speed digital circuits 20 are busy, the CPU takes a detour using the ISDN network 25 and sends ISDN calls (S12).

When ISDN calls are sent, the CPU determines whether or not the voice signals should be compressed (S13). When the voice signals are not to be compressed, the CPU controls the calls in the normal way; when the voice signals are to be compressed, the CPU determines whether or not the communication channel 26 needs to be set up within the ISDN circuit network 25 with respect to the targeted station (S14).

At the Step 14, when the result of the judgment is that the communication channel 26 has to be set up, the CPU determines whether or not there is a needed band width remaining within the allocated band width (S15). When there is a needed band width remaining within the allocated band width, there is no need to set up a new communication channel 26 within the ISDN network 25. Then, the CPU waives the process for setting up a communication channel and controls compressed voice calls (S18).

When judgment at the step S14 is that the communication channel 26 is not set up and judgment at the step S15 is that there is insufficient band width remaining, the CPU determines that there is a need for setting up a communication channel 26, and then, drives the ISDN network 25 to set up the communication channel 26 (S16).

Setting up the communication channel begins with transmitting the call control data (message) on the ISDN network 25. First, the outgoing station sends a call setting message M21. This call setting message M21 includes the data showing the call was set to detour using the ISDN network 25 because all the high speed digital circuits 20 were busy.

The incoming station, which received the aforementioned call setting message 21, analyzes the call setting message and recognizes that the incoming message took a detour using the ISDN network 25, and executes the process required for processing incoming calls (S17) to set up a communication channel 26 within the ISDN network 25. As soon as calls are processed, the incoming station sends a call setting reception message M22, which indicates that the incoming station received the call setting message M21 which was normally processed, and sends the reply message M23 which indicates that the incoming station has set up the communication channel 26.

The outgoing station recognizes that the communication channel 26 is set up by receiving this reply message M23. The communication channel 26 is set up between multiplexers according to the above process and control data control sequence.

Note that the call control data and its sequence for the D-channel required for setting up the ISDN network 25 follow the call control data and its control sequence determined for controlling ISDN circuits.

In addition, as soon as the setting up of the communication channel 26 for the ISDN network 25 is completed according to the aforementioned process, or the communication channel 26 within the ISDN network 25 is already set up, and there is a needed band width remaining within the allocated band width at step S15, the CPU 12 executes the call control process for transmitting the voice compression data to this communication channel 26 (S18). This call control is executed when data are transmitted on the Dp-channel which is the control channel within the high speed digital circuits 20.

First, the outgoing station sends the call setting message M30. This call setting message M30 is constituted in the same manner as the call setting message M10 used for controlling calls on the high speed digital circuits but includes data that has no relation with the high speed digital circuits 20. The incoming station that receives this call setting* message M30 recognizes that it is a message addressed to itself and executes the incoming process (S19) by executing the same process as the call control message process for the high speed digital circuits 20.

After that, the same process as the call control process for the high speed digital circuits 20 is executed as illustrated in FIG. 4; then, the call setting reception* message M31, call* message M32 and reply* message M33 are sent to be connected with the communication channel switch 11 linked with the ISDN network 25 (S20).

The outgoing station that received the reply* message M33 connects the ISDN network 25 and the communication channel switch 11 (S21) to establish a communicating status using the ISDN network 25.

These XXX* messages are the same as the XXX messages used for call control for the high speed digital circuits 20; the communication channel 26 in the ISDN network 25 is controlled in the same way as the high speed digital circuits 20.

Figure 7:
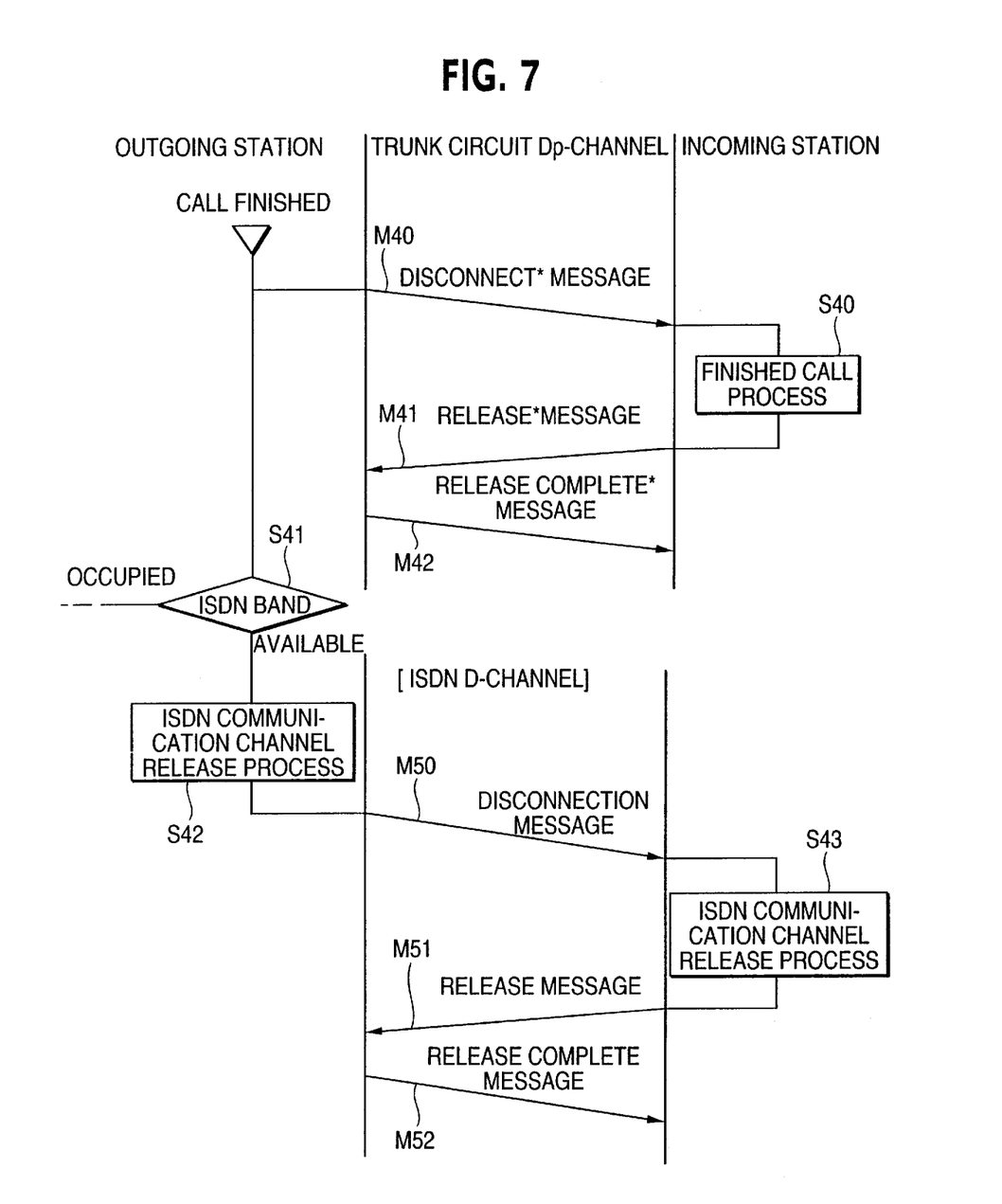
FIG. 7 is a diagram showing a control sequence for terminating communication on ISDN circuits.

FIG. 7 illustrates the control sequence when communications are completed. The actions at the time of completing a call are described referring to the flow chart and the send/receive sequence illustrated in FIG. 7.

First, when the outgoing station detects that a call is completed, then it sends a disconnection* message M40 to complete the communication over the ISDN network 25 in the same manner as it did for setting up a call using the Dp channel of the high speed digital circuits 20.

The incoming station that received this disconnection* message 40 executes the call completing process (S40) and sends the release* message M41.

The outgoing station that received this release* message M41 sends the release complete* message M42. The fact that the incoming station receives this release complete* message releases the communication status over the ISDN network 25.

These sequential messages are transmitted via the Dp channel 21 of the high speed digital circuits 20.

When this release sequence is completed, the outgoing station determines whether or not the aforementioned communication channel 26 of the ISDN network 25 is engaged with another call (S41).

At this step, S41, if the communication channel 26 is engaged with another call, the following process is waived to complete the sequence of processing.

On the other hand, if all communications in the aforementioned communication channel 26 are completed and the channel is available, the release process for the aforementioned communication channel 26 is executed (S42). At this time, a disconnection message M50 is sent to the D-channel within the ISDN network 25.

The incoming station that received this disconnection message M50, releases the aforementioned communication channel 26 (S43) to send the release message M51.

In addition, the communication channel 26 within the ISDN network 25 is released by the outgoing station receiving the release message M51 and sending the release completion message M52.

This sequential message transmission is carried out on the D-channel in the ISDN network 25.

Figure 8:
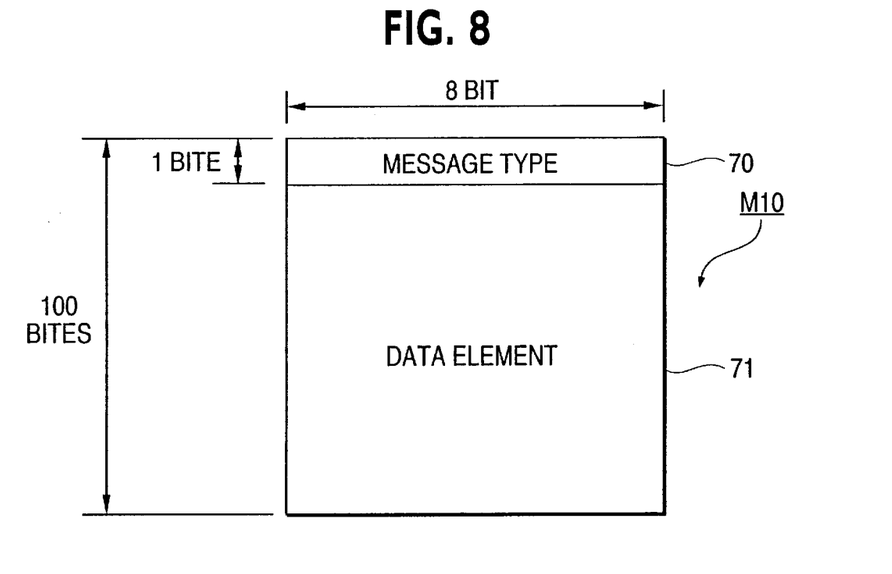
FIG. 8 is a diagram showing a configuration of call setting messages during call control on high speed digital circuits.

FIG. 8 illustrates the configuration of the call setting message M10 transmitted on the Dp-channel when controlling calls on the high speed digital circuits 20 and constructed with the message type 70 and data element 71. Now, the message type 70 includes the data showing that it is the call setting message; the data element 71 includes the data needed to control calls with voice compression data and applicable band width and the like.

Figure 9:
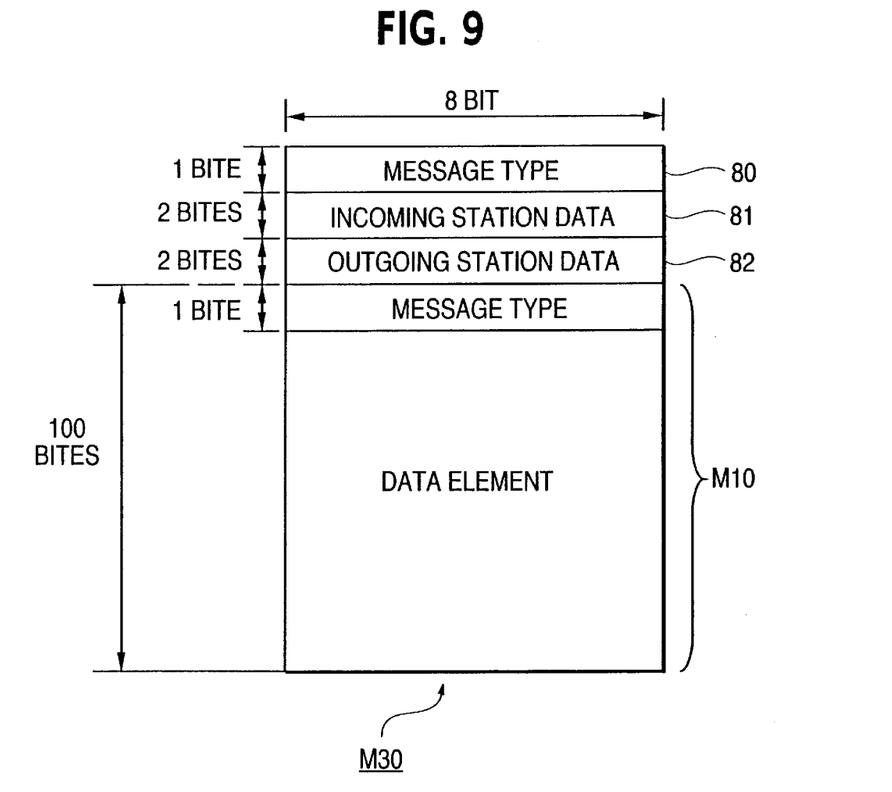
FIG. 9 is a diagram showing a configuration of call setting messages during call control on ISDN circuits.

FIG. 9 illustrates the configuration of the call setting* message M30 transmitted on the Dp channel within the high speed digital circuits 20 for multiplexed transmission made available by call controlling on the communication channel 26 within the ISDN network 25. These message are constructed with the band width setting message M10, type M80 message indicating that this is a call control signal for the ISDN network 25, incoming station data M81 indicating the destination of the signal, and the outgoing station data M82 indicating the sender of the signal such that these messages are sent/received between multiplexers installed on the communication channel 26 of the ISDN network 25. Actual call control data are the same as the call setting messages used for the high speed digital circuits 10.

Call control between the two stations is described above, however, the same process is possible among multiple stations. The call control messages for the ISDN network 25, when each multiplexer recognizes the message type M80 and when the incoming station data M81 is not addressed to oneself, relays to the destination such that messages are sent/received in series.

In addition, voice compression transmission is described, however, calls departing from data terminals can transmit multiplexed data on ISDN circuits through the same processing.

As such, this invention can efficiently and dynamically multiplexes transmission on ISDN circuits.

As described, this invention realizes the dynamic, efficient, multiplexed transmission on ISDN circuits. In addition, when taking a detour using ISDN circuits when all the high speed digital circuits are busy, compressed information transmitted through a trunk circuit can be automatically transmitted in the same format, providing an increased operational efficiency to ISDN circuits.

What is claimed is:

1. A multiplexing system, comprising:
   a plurality of call stations, each call station including a data terminal, a voice terminal, a voice compressor for compressing voice information from said voice terminal, and a multiplexing device for multiplexing data information from said data terminal and compressed voice information from said voice compressor;
   a high speed digital circuit having a control channel for controlling circuit connections between call stations and a communication channel for communicating voice and data information between call stations;
   an ISDN circuit having a control channel for controlling circuit connections between call stations and a communication channel for communicating voice and data information between call stations;
   a controller responsive to origination of voice and data information at a first call station to be communicated to a second call station for transmitting call control information on the control channel of said high speed digital circuit to control communication of the voice and data information on said high speed digital circuit from the first call station to the second call station, and responsive to the communication paths on said high speed digital circuit being unavailable, for setting a communication path on said ISDN circuit between the first call station and the second call station and transmitting the call control information on the control channel of said high speed digital circuit for communication of the voice and data information on the set communication path on said ISDN circuit so as to communicate calls of multiplexed data information and compressed voice information on one communication path using only necessary bandwidth.

2. A multiplexing system as set forth in claim 1, wherein said multiplexing device further includes means for including identification information of a generating call station and a receiving call station of the communication in the call control information transmitted on the control channel of said high speed digital circuit.

3. A multiplexing system as set forth in claim 2, wherein said multiplexing device further includes means responsive to receipt of the call control information on the control channel of said high speed digital circuit for the communication using the communication channel of said ISDN circuit, for determining the identification of the receiving call station to which the information is addressed, and if the information is addressed to another call station, transferring the information to said another call station.

4. A multiplexing system as set forth in claim 1, wherein said multiplexing device further includes means responsive to a new call being originated while a communication path is established on said ISDN circuit, for determining whether there is any vacancy in the communication channel on said high speed digital circuit, and if so, for giving priority to use of said high speed digital circuit.

5. A multiplexing system as set forth in claim 1, wherein said multiplexing device further includes means responsive to detection of termination of a call on the communication channel of said ISDN circuit for determining whether other calls exist on the communication channel of said ISDN circuit, and if not, for terminating the communication path on said ISDN circuit.

* * * * *